United States Patent Office

3,748,273
Patented July 24, 1973

3,748,273
PREPARATION OF SOLS BY HYDROGEN
REDUCTION OF NITRATE SOLUTIONS
Jean G. Smith, Baltimore, Md., assignor to the United
States of America as represented by the United States
Atomic Energy Commission
No Drawing. Filed May 4, 1971, Ser. No. 140,281
Int. Cl. C01g 43/02
U.S. Cl. 252—301.1 S                              5 Claims

ABSTRACT OF THE DISCLOSURE

A process for converting metal nitrate solution into colloidal oxides by exposing the solution to hydrogen under pressure with vigorous stirring in the presence of a hydrogenation catalyst.

BACKGROUND OF THE INVENTION

This invention relates to the production of sols of actinides, and related metals from their respective nitrate solutions. More particularly, the invention relates to the preparation of uranium dioxide sols in situ by reduction with hydrogen of both uranyl ions and nitrate ions in aqueous solutions with simultaneous or consecutive hydrolysis of the intermediate uranous ions to form colloidal uranium dioxide.

U.S. Pat. 3,281,373, issued Oct. 25, 1966, describes a process in which $UO_2$ sols are prepared by autoclaving chloride solutions which have been previously reduced to the plus four state by various means including hydrogenation.

The present process is an improvement over the above-described process in that the reduction and hydrolysis are achieved simultaneously or sequentially in the same piece of equipment. The anion is an oxidizing anion, in most cases the nitrate. The pH of the starting solution is adjusted to a pH of less than 1 by the addition of any monovalent acid such as hydrochloric, nitric, formic, etc.

In summary, this invention is a process for forming metal oxide sols and comprises contacting an aqueous nitrate solution of the desired metal with hydrogen gas in the presence of a catalyst until the oxide is formed, followed by separation of the oxide from the catalyst.

Actinide oxide sols and suspensoids are of primary interest in preparing ceramic nuclear fuel elements. Colloidal zirconia is of interest as a diluent. The sols and suspensoids of the rare earth elements, including yttrium, are also useful as diluents, and in some cases, along with hafnium, as burnable poisons or as control materials.

The colloidal oxides can be converted to highly sinterable and pure powders by such techniques as vacuum evaporation or addition of a miscible organic liquid, such as acetone, preferably one with a low boiling point which may be subsequently removed by distillation at low temperature. The purpose of the organic liquid is to destroy the repulsive forces of the electric double layer which normally prevents coagulation in aqueous media. The micelles will consequently coagulate and the bulk of the liquid may then be removed by decantation. Traces adhering to the solid may be removed by subjecting the separated solvent to a vacuum, perhaps with some heat, to drive off the last of the liquid. The resulting powders may then be pressed into pellets and loaded into fuel pins for use in nuclear reactors. The sols may be used to prepare Vipac fuel elements by converting the sols into microspheres of two or three selected size ratios.

The preparation of microspheres is not part of this invention. Suitable methods of preparing these microspheres are disclosed in U.S. Pat. 3,331,785, issued July 18, 1967. A preferred apparatus for preparing these microspheres is described in U.S. Pat. 3,340,567, issued Sept. 12, 1967. Broadly speaking, the process comprises preparing sols and dropping the sols through a column of a water-extracting solvent. A particle outlet is positioned at the bottom of the column for removing the product spheres.

The resulting microspheres are sintered to the desired density by heating to a predetermined temperature for the requisite period of time. Spheres having densities near theoretical can be prepared by heating to a temperature above about 1200° C. in an atmosphere of hydrogen. The resulting high density spheres are loaded into a fuel pin by vibratory techniques to achieve a packed density of at least 80%.

The objective of this invention is to provide a direct and inexpensive method for preparing dispersible actinide oxide solids, suspensoids, and sols from solutions of the respective nitrates.

For purposes of simplicity, we will describe our process using uranyl salts although it is obvious that the same techniques can be applied to the preparation of sols of other actinides and related metal oxides.

The invention is particularly useful for the direct conversion of uranyl nitrate effluents from recovery plants designed to recover spent power reactor fuels and convert them into a form, namely a sol, which can then be used to obtain new reactor fuels. The reprocessing plants using the Purex-type process yield two major streams, the recovered uranium as uranyl nitrate solution and the plutonium as plutonyl nitrate solution in excess nitric acid.

In general, this invention is a process for forming dispersed or readily dispersible uranium dioxide particles comprising the steps of contacting an aqueous uranyl salt with hydrogen gas in the presence of a platinum or other noble metal catalyst until uranium dioxide particles are formed and separating the particles from the catalyst.

The uranyl salt is the salt of an oxidizing acid, preferably the nitrate. The salt solution can contain the equivalent of from about 1 to 600 grams of $UO_2$ per liter of solution. The preferred equivalent $UO_2$ concentration in uranyl nitrate solution ranges from 200 to 400 grams of $UO_2$ per liter of solution. The effluent from the reprocessing plants that use a Purex process fortuitously contain generally about 250 gram equivalents of uranium per liter. At temperatures above about 40° C., the nitrate ion is decomposed to nitrogen oxide gas and ammonium ions during the reaction. The pH of the solution should be reduced to a pH of less than about 1.0 by the addition of a monovalent acid such as nitric acid, hydrochloric acid, formic acid, etc. The use of minimal acid not only shortens reaction time but also favors reduction of nitrate to the more easily removed gaseous products.

The hydrogen gas pressure in the reaction vessel can range from about 100 p.s.i. up to the practical limits of the equipment. The higher hydrogen gas pressures accelerate the rate of reaction. Hydrogen gas pressures of about 300 p.s.i. are preferred.

In our novel process, strong agitation under pressure is essential. The most satisfactory combination of reaction conditions is the combination of hydrogen under a pressure of at least 100 p.s.i. with strong agitation in the presence of a noble metal catalyst and a nitrate solution heated to between about 30° and 80° C., and preferably to between about 40° and 60° C. The agitation must be sufficient to create a deep vortex in the liquid. A circulating loop under pressure or a rocking autoclave would also give satisfactory results.

The uranyl salt solution is contacted with the hydrogen gas in the presence of conventional reduction catalysts. Examples of suitable catalysts include platinum gauze, platinum oxide, platinum black, and palladium or platinum supported on an inert base such as carbon or alumina.

The reaction is allowed to proceed until a dispersible residue of uranium dioxide is formed. The product is then separated from the catalyst. The product is a black sol or suspensoid or a readily dispersible residue of uranium dioxide particles. The residue can be separated from the reaction mixture by decantation or filtration and redispersed in water or a dilute acid solution to form a sol or suspensoid. Sols or suspensoids are formed directly from low concentration uranyl salt solutions, where the concentration of the interfering anion is low, or from nitrate solutions in which the nitrate ions have been largely decomposed, or where the reduction temperature is below that required for residue formation. In this process, the uranyl ions are reduced to uranous ions as the nitrate ions are destroyed through the conversion to nitrogen oxide gas plus some ammonium ions.

When the reaction is completed and the stirring is stopped, the residue settles. The clear supernatant, which may contain some residual nitrate and ammonium ions, is removed by decantation. The addition of deionized water results in a complete dispersion of the residue to form a sol. The catalyst remains behind and may be separated by decantation or by filtration. The uranium dioxide micelles are generally spherical to cubic in shape and range in size from about 5 to 100 millimicrons.

Another critical variable is the time of the reaction. The time required for reduction and the ensuing hydrolysis to form colloidal micelles is, of course, dependent on the hydrogen pressure used. Satisfactory results are obtained in periods of about 2-4 hours, at hydrogen pressures of about 300 p.s.i. and temperatures averaging 60° C. with the equivalent $UO_2$ concentration of the system about 250 g. per liter. When the pressure is reduced to about 100 p.s.i., however, the reduction-hydrolysis requires about 12 to 14 hours and the residue recovered cannot be completely dispersed. More catalyst must be added to reduce the time to 3-4 hours.

The uranium dioxide residues are dispersible to stable sols when the reaction is stopped when the pH of the system falls within the range of about 1 to 2.5. The preferred end point is about 2.3±0.1 for complete dispersibility and completeness of reduction. The residues can be redispersed in aqueous media having a pH within the range of about 1 to 5.

The uranium dioxide particles contain excess oxygen. The uranium dioxide particles, on analysis, have been found to contain oxygen contents ranging from 2.0 to 2.4 atoms of oxygen per atom of uranium, a uranium dioxide composition of $UO_{2-2.4}$. This extra oxygen is contemplated within the meaning of the term uranium dioxide. A major portion of this excess oxygen is believed to be interstitial and is not detrimental in the product and can be removed in later processing steps, such as in the sintering operation.

In the runs described in the following examples, the pH of the solutions and sols were measured with a Beckman Model G pH meter, and the specific resistance of the solutions and sols was measured with an Industrial Instruments Company Conductivity Bridge, Model RC-16 Bl.

The invention is further illustrated by the following specific, but non-limiting examples.

EXAMPLE 1

A stainless steel pressure vessel was equipped with a glass liner. A Teflon stirring rod containing an upper and a lower stirring member was installed in the pressure vessel. The pressure vessel was placed within a heating mantle with a Variac control. Temperature was followed by means of an iron-constantan thermocouple inserted with a Teflon-sheathed thermowell in the autoclave. Provision was made to cool samples withdrawn from the reactor during the course of reaction before exposing them to air.

A solution of uranyl nitrate was prepared to contain 250 grams of $UO_2$ per liter by diluting to one liter with water a 625 ml. volume of uranyl nitrate stock solution that contained 400 grams of $UO_2$ per liter. The pH of the resultant solution was 1.6 and the specific resistance, 13.4 ohm-centimeters. The pH of the solution was adjusted by adding 3.78 ml. of concentrated hydrochloric acid. After the acid addition, the pH was 1.1 and the specific resistance 11.7 ohm-centimeters. The solution was added to the autoclave along with 0.5 gram of a 5% platinum-on-carbon catalyst.

The reactor was closed and flushed with hydrogen. The temperature was brought up to 60° C. and then flushed again with hydrogen. The pressure was then increased to 320 p.s.i. with hydrogen. The run was continued for a period of 3 hours at a temperature of 60° C. The heating was discontinued and the vessel cooled in cold water. After the vessel had stood at room temperature for a period of about 72 hours, it was opened and found to contain a black fluid which had a tendency to settle out leaving a clear supernatant. The pH was 2.6 and the specific resistance 19.55 ohm-centimeters.

The slurry settled to a clear supernatant and about 142 ml. of a black residue. The residue was totally dispersed in water to a volume of about 500 ml. The catalyst was recovered from the sludge by filtration.

Analysis of the product sol showed it to contain about 417 grams of $UO_2$ per liter and to be essentially free of nitrate ion. The sol pH was 2.0 and the specific resistance, 48 ohm-centimeters.

What is claimed is:

1. A process for preparing sols of actinide oxides by the hydrogen reduction of a solution of an oxidizing salt of the actinide oxides which comprises:
    (a) preparing solutions of the desired salts in a concentration equivalent to 1 to 600 grams of actinide oxide per liter, and transferring said solution to a pressure vessel,
    (b) adjusting the pH of the solution to about 1.0 by the addition of a monovalent acid, selected from the group consisting of hydrochloric, nitric, and formic acids,
    (c) adding a noble metal hydrogenation catalyst in an amount sufficient to catalyze the reduction reaction,
    (d) closing said pressure vessel and pressurizing with sufficient hydrogen to increase the pressure to about 100 to 500 p.s.i.g.,
    (e) heating to a temperature of 30° to 80° C. and agitating the reactor for a period of 2 to 4 hours to reduce the salt to the oxide and form colloidal micelles, and
    (f) reducing the pressure to atmospheric, removing the catalyst and recovering the product sol.

2. The process according to claim 1 wherein the catalyst is about 5% platinum on a carbon base.

3. The process according to claim 1 wherein the metal salt is uranyl nitrate and the salt is made up to contain the equivalent of 200 to 400 grams of $UO_2$ per liter of solution.

4. The process according to claim 1 wherein the pressure vessel is pressurized to a pressure of about 300 p.s.i.g. with hydrogen.

5. A process for the preparation of a urania sol by the hydrogen reduction of a nitrate solution which comprises the steps of:
    (a) Preparing a solution of uranyl nitrate in a concentration equivalent to 200 to 400 grams of $UO_2$ per liter,
    (b) Adjusting the pH of the solution to about 1.0 with hydrochloric acid, (c) Adding a platinum on carbon hydrogenation catalyst,
(d) Transferring said nitrate solution to a pressure vessel and adding hydrogen to a pressure of about 300 p.s.i.g.,
(e) Heating said pressure vessel with constant stirring to a temperature of about 40 to 70° C. and holding at said temperature with stirring for about 2 to 4 hours, and
(f) Cooling the reactor, separating the catalyst, and recovering the product sol.

References Cited
UNITED STATES PATENTS

| | | | |
|---|---|---|---|
| 3,401,122 | 9/1968 | Cogliati et al. | 252—301.1 |
| 3,361,676 | 2/1968 | McBride et al. | 252—301.1 |
| 3,281,373 | 10/1966 | Smith et al. | 252—301.1 |

CARL D. QUARFORTH, Primary Examiner

R. L. TATE, Assistant Examiner

U.S. Cl. X.R.

423—261